Patented Apr. 25, 1950

2,505,347

UNITED STATES PATENT OFFICE 2,505,347

COATING COMPOSITION OF UNSATURATED ALKYD RESIN

William F. Brucksch, Jr., Bethany, Conn., assignor to United States Rubber Company, New York, N. Y., a corporation of New Jersey No Drawing. Application August 31, 1945, Serial No. 613,949

3 Claims. (Cl. 260—45.4)

This invention relates to improvements in low pressure impregnating-resin compositions belonging to that class shown in Ellis U. S. Patents Nos. 2,255,313 and 2,195,362.

One of the difficulties encountered with many of the low pressure resins is that textile fabrics, including glass ("Fiberglas") cloth, when coated or impregnated with the heat-hardenable polymerizable resin mix, are difficult to pattern-cut at room temperatures without fraying. This is particularly true with the uncured resin-impregnated glass cloth.

An object of this invention is to provide a composition which will substantially reduce or remove this disadvantage. Other objects will be apparent from the description hereinafter.

I have found that the said fraying disadvantage may be overcome, if the polyhydric alcohol component is chosen and regulated so as to form a definite type of polyester, and the monomeric resin-forming body to be copolymerized with the said polyester, be diallyl phthalate.

As disclosed and claimed in U. S. Patent No. 2,255,313, the molecular proportions of the glycol and unsaturated dicarboxylic acid, are such that molecular equivalents of the glycol and acid are present, so that there is one carboxyl group of the acid to one hydroxyl group of the glycol.

According to the present invention, a mixture of ethylene glycol and diethylene glycol is chosen in which the molar ratio of ethylene glycol to diethylene glycol is from 3:1 to 9:1. This is a composite glycol component for forming a polyester of low acid number (20–60) with fumaric acid, and the resulting soluble, fusible polyester which can be designated polyfumarate of ethylene glycol-diethylene glycol, is polymerized with the diallyl phthalate to an acetone and alkali-insoluble, infusible mass.

The mixture may be cast polymerized, if desired. However, since the invention is developed with the view of preparing for pattern-cutting, an uncured resin-impregnated fabric of superior anti-fraying properties, the polymerizable mixture of the polyester, and the diallyl phthalate, containing curing catalyst, and inhibitor, is applied to the glass fabric, etc., in the conventional manner. Excess of the mixture is removed. My polymerizable mix has the property of being liquid for a considerable time when warm and of being a waxy solid mass at temperatures of 10–40° C., all without copolymerizing. A glass cloth impregnated with the liquid mix can, when the resinous mass becomes waxy, be cut at room temperatures without fraying. The pattern can then be easily combined to form a finished article and the impregnated product can be cured with applied heat.

In case it is desired to cure at lower temperatures, e. g., room temperature, a polymerization promoter may be added. In such case no additional heat is necessary since the exothermic heat is sufficient to effect a cure. Also, my resinous mix may be used to produce laminated fabrics and composite laminated products as is known to be produced with other low pressure impregnating resins.

Generally, the polyfumarate polyester (alkyd) component varies from about 55 to 65% by weight of the combined weight of the polyester and the diallyl phthalate present in the mix. This excludes the small amount of peroxide catalyst, as illustrated by:

| | Parts by Weight |
|---|---|
| Alkyd | (55–65) (X) |
| Diallyl phthalate | (100–X). |
| Benzoyl peroxide | 1–3% based upon the total weight of the components. |

In the above formula, the composition of the alkyd is:

| | Moles |
|---|---|
| Ethylene glycol | 0.75 to 0.90 ($y$). |
| Diethylene glycol | 1.0—$y$. |
| Fumaric acid | 1.0. |
| Hydroquinone | 500–2,000 p. p. m. based upon the total weight of the monomers. |

My polymerizable mix containing diallyl phthalate also has less toxicity than one prepared by the use of styrene.

The following example illustrates a mode of practicing the invention:

Example 1

| Alkyd | Moles |
|---|---|
| Diethylene glycol | 0.18. |
| Ethylene glycol | 0.82. |
| Fumaric acid | 1.00. |
| Hydroquinone | 1,100 p. p. m. of alkyd. |

The mix is esterified 5 hours starting at 160° C.

with the temperature rising to 220° C., to an acid value of less than forty.

| | Percent by weight |
|---|---|
| Alkyd | 60 |
| Diallyl phthalate | 40 |
| Benzoyl peroxide | 2 |

The alkyd and the diallyl phthalate at 100° C. are blended, the mix cooled to 70° C., and the benzoyl peroxide is then added.

The whole process from the beginning of the esterification to the addition of 70° C. of benzoyl peroxide should preferably be carried out under an inert atmosphere such as carbon dioxide or nitrogen.

The composition is now ready for use as a coating agent. It can be held at 70° C., exposed to air for about 3 hours. It softens at about 65° C., and at temperatures of 10–40° C. is a waxy solid.

Glass cloth impregnated with my material can be readily cut, molded and cured.

By varying the alkyd proportion from about 55 to 65 parts by weight, and the ethylene glycol molage from about .75 to .90 of the total glycol molage, as aforesaid, a waxy solid polymerizable mix at room temperature is obtainable, which composition has a softening or melting range from about 60 to 80° C., and for most purposes is about 65° C.

The same anti-fraying results do not follow when one uses, in place of the composite glycol polyester, a glycol polyester which is derived wholly from ethylene glycol or wholly from diethylene glycol. The properties of the polymerizable mass in the latter instance is entirely different, as shown by the following example, in which compositions derived from using the composite glycol are compared with compositions derived from using either the ethylene or diethylene glycol alone.

*Example 2*

| Glycol | Mol Ratios | Fusion Temperature of Product |
|---|---|---|
| Ethylene | 1.0 | 105°C., Dry solid. |
| Ethylene-diethelene | 0.90–0.10 | 80°C., Waxy solid. |
| Ethylene-diethylene | 0.80–0.20 | 60° C., Waxy solid. |
| Diethylene | 1.0 | Liquid. |

While certain curing catalysts and inhibitors have been referred to in the examples, it is to be understood that other catalysts and inhibitors may be employed as known to those in the art, and as shown by the aforesaid Ellis patents.

Having thus described my invention, what I claim and desire to protect by Letters Patent is:

1. A polymerizable mix comprising a soluble, fusible polyfumarate of ethylene glycol-diethylene glycol, and diallyl phthalate, the molar ratio of the ethylene glycol to the diethylene glycol ranging from 3:1 to 9:1, the polyfumarate of ethylene glycol-diethylene glycol having an acid number of 20–60 and constituting from 55 to 65% by weight of the combined weight of the same and the diallyl phthalate, and which mix is a waxy solid mass at 10–40° C.

2. A coating composition for rendering uncured fabrics coated therewith more amenable to pattern-cutting without fraying, which composition is a waxy solid at room temperatures, containing monomeric diallyl phthalate and a soluble, fusible polyfumarate of ethylene glycol-diethylene glycol having an acid number of 20–60, the molar ratio of the ethylene glycol to the diethylene glycol ranging from 3:1 to 9:1, the polyfumarate of ethylene glycol and diethylene glycol constituting from 55 to 65% by weight of the combined weight of the same and the diallyl phthalate.

3. A soluble, fusible polyfumarate of ethylene glycol-diethylene glycol, the molar ratio of the ethylene glycol to the diethylene glycol ranging from 3:1 to 9:1.

WILLIAM F. BRUCKSCH, Jr.

REFERENCES CITED

The following references are of record in the file of this patent:

UNITED STATES PATENTS

| Number | Name | Date |
|---|---|---|
| 1,714,173 | Kessler et al. | May 21, 1929 |
| 2,111,762 | Ellis | Mar. 22, 1938 |
| 2,308,494 | D'Alelio | Jan. 19, 1943 |
| 2,409,633 | Kropa | Oct. 22, 1946 |